July 2, 1957     H. C. M. LONGACRE     2,798,141
MEANS AND METHOD FOR MAKING A VACUUM-TIGHT
WELD BY INDUCTION HEATING
Filed Feb. 28, 1955
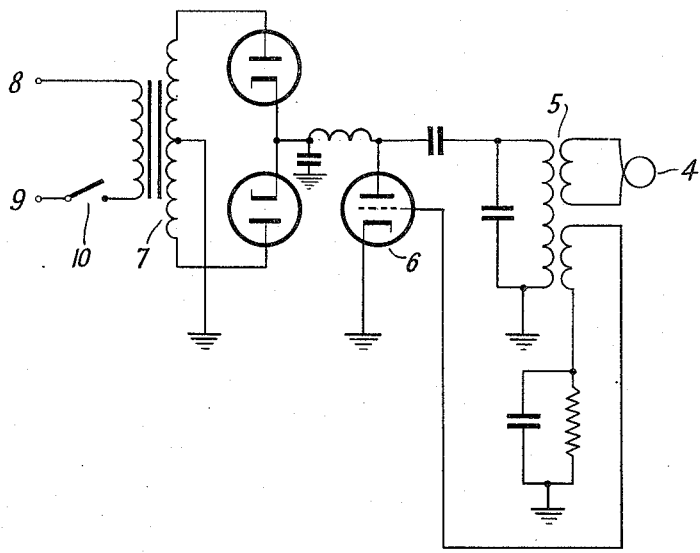
*Fig. 1*
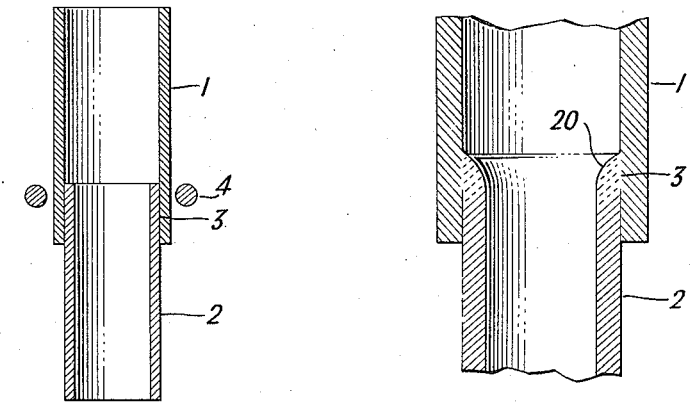
*Fig. 2*      *Fig. 3*
INVENTOR
HENRY C. M. LONGACRE
BY
ATTORNEY United States Patent Office 2,798,141
Patented July 2, 1957

2,798,141

MEANS AND METHOD FOR MAKING A VACUUM-TIGHT WELD BY INDUCTION HEATING

Henry C. M. Longacre, Glen Oaks, N. Y., assignor to Sylvania Electric Products Inc., a corporation of Massachusetts Application February 28, 1955, Serial No. 490,815

6 Claims. (Cl. 219—9.5)

My invention relates to methods and means for welding dissimilar metals or alloys.

In one conventional process for welding two dissimilar metal or alloy members together, the sections to be joined are first fluxed, then placed in juxtaposition, and induction heated in an inert or reducing atmosphere or a high vacuum to form the weld.

This atmosphere limitation (hitherto required to prevent oxidation of the heated surfaces and weld contamination caused by entrapped oxygen) has severely limited the use of this process.

Accordingly, it is an object of the present invention to provide new and improved welding methods and apparatus which make use of induction heating and yet obviates this difficulty.

Another object is to provide a novel induction heating welding process which can be performed in an oxygen containing atmosphere without the use of welding flux.

Still another object is to provide a novel induction heating welding process in which the heat of welding is confined to the area of making the weld.

Yet another object is to provide novel induction heating welding apparatus which supplies heat only to the area of making the weld and does not heat adjacent areas.

These and other objects of the invention will either be explained or will become apparent to those skilled in the art when this specification is studied in conjunction with the accompanying drawing wherein:

Fig. 1 is a schematic diagram of the welding apparatus used;

Fig. 2 shows the relation between the work coil and the members to be welded; and Fig. 3 shows a welded structure produced by means of my welding process.

In my invention, a first metallic member having a first melting temperature and a first thermal expansion coefficient and provided with a projection of given external contour, and a second metallic member having a second and higher melting temperature and a second and lower expansion coefficient and provided with a hollow section of corresponding internal contour are mounted together in such manner that the projection is forced into the hollow section; thus, a common continuous peripheral contact area (the weld area) is established between the two members. A single turn induction work coil energized by a high frequency current generator is so positioned outside of but adjacent to the second member that the contact area is inductively heated. Eddy currents are induced in the surface of the second member, heating same, and this heat is transferred to the first member by conduction.

As soon as the contact area of the first member is heated to the first temperature, the portion of the first member within this area melts and fuses to the corresponding portion of the second member to form the weld. At this point, the coil is de-energized.

The coil is only energized for a short interval, on the order of a second or less so that the total quantity of heat generated is small. Since only one coil turn is used, the inductive action is localized and heat can only be generated in a small region in the neighborhood of the coil. As a result, the areas adjacent the weld area are not heated appreciably.

Because of the tight fit between the two members, only a small amount of air is entrapped between the members. In addition, during the heating cycle, because of the relation of the expansion coefficients, the first member expands with considerable force against the second member in the weld area. This action necessarily forces any entrapped air or other gases out of the weld area and prevents appreciable oxidation. Consequently, the welding process can be carried out in air; no oxygen-free atmosphere is required. However, any conventional atmosphere can be used if desired.

Referring now to the figures, there are provided two clean hollow tubes 1 and 2. A section of tube 2 is forced into tube 1 to establish a common peripheral contact area 3 which represents the weld area. Tube 2 has an outside diameter slightly larger than the inside area of tube 1 to insure close physical contact between tubes at the weld area.

Tube 2 has a lower melting temperature and higher coefficient of expansion than tube 1. In this example, tube 2 is formed from copper and tube 1 from an iron alloy.

A single turn work coil 4 is positioned outside of said concentric to tube 2 in such manner that the coil surrounds the weld area 3. This coil is inductively coupled to a tank circuit 5 conventionally tuned to a frequency for example, on the order of 200,000 cycles per second or higher. Tank circuit 5 is included in a conventional oscillator which includes triode 6. Direct operating potential is supplied to the oscillator through a rectifier circuit 7. 60 cycle alternating voltage is supplied to terminals 8 and 9 and through on-off switch 10 to the rectifier circuit.

When switch 10 is thrown to the "on" position, the magnetic field established around coil 4 induces eddy currents in the surface of tube 1 in the region of the weld area. This surface is heated and its temperature rises rapidly. Heat is transferred by conduction to the corresponding surface of tube 2, which, having a lower melting point than tube 1, will melt and fuse to tube 1 at the weld area before tube 1 is heated to its melting point.

Since the magnetic induction field is only established around a single turn coil, the portions of tubing adjacent the weld area are not heated appreciably through the action of the field. Further, as the heating cycle is short, on the order of a second or less, virtually all the heat transferred by conduction is confined to the weld area. As a result, there is appreciably no temperature rise in the tubing at points outside of the weld area.

For tubing diameters on the order of 0.3 inch and tubing thicknesses on the order of 0.03 inch, a copper-iron alloy weld requires a heating cycle on the order of 0.5 second. Changes in dimensions, or materials used or the like, will require changes in the heating cycle. However, the necessary adjustment can readily be made by any skilled operator.

Fig. 2 shows the completed welded structure. It will be apparent that the top edge 20 of tube 2 is curved in to meet tube 1. The welding process is normally continued until this edge curve is produced, at which point the heating cycle is terminated. If the welding process is continued beyond this point, molten metal from tube 2 will drip downwards and tend to seal off the opening of tube 2. In this situation, it is necessary to insert a retainer ring on the inside of tube 2 and thus prevent seal formation. However, no such ring is necessary when the heating cycle is terminated at the proper time.

This process provides a vacuum tight weld and can be carried out in free air or in various atmospheres. Any irregular as well as circular members can be welded together in this fashion, as long as a section of the inner metal piece is confined in and makes intimate contact with a corresponding section of the outer metal piece.

The members to be welded must be properly cleaned before pressing together; no flux is required. Nevertheless, if necessary, various conventional fluxes can be used without impairment of the process.

While I have shown and pointed out and described my invention in one preferred embodiment, it will be apparent to those skilled in the art that many other modifications can be made within the scope and sphere of my invention as defined in the claims which follow.

What is claimed is:

1. A process for welding together, by induction heating, a first metallic member having a first melting temperature and a first thermal expansion coefficient and provided with a projection of given contour, and a second metallic member having a second and higher melting temperature and a second and lower coefficient of expansion, said second member being provided with a hollow section of corresponding contour, said process comprising the steps of forcing the projection of said first member into the hollow section of said second member to form a common peripheral contact area therebetween which is designated as a weld area; and establishing a high frequency magnetic field around said second member in such manner that the heating effects are confined to the weld area and said weld area is heated to a temperature which is at least equal to said first temperature and is less than said second temperature, said field being established for a short interval which is sufficient to permit weld formation and is insufficient to cause appreciable heating of the member surfaces adjacent to the weld area, the relative expansion between said members being such as to force any entrapped gases out of the weld area during weld formation.

2. A process for induction heat welding a first metallic member having a given melting temperature and coefficient of thermal expansion to a second metallic member having a lower melting temperature and a higher coefficient of expansion, a section of said second member being mounted within a section of said first member in such manner that a common area of contact is established between these sections, said process comprising the step of producing a high frequency magnetic field about the second member concentric with the common area and confined in its heating effects thereto to raise said area to a temperature which is at least equal to said first temperature and is less than said second temperature, the relative expansion between said members being such as to force any entrapped gases out of the weld area during weld formation, whereby said members are welded together in said common area.

3. The process as set forth in claim 2 wherein the field is existent for a period having a maximum value on the order of several seconds.

4. The process as set forth in claim 2 wherein the weld is produced in an oxygen-containing atmosphere.

5. Apparatus for welding a first metallic member having a predetermined melting temperature and thermal expansion coefficient to a second metallic member having a lower melting temperature and a higher coefficient of expansion, a section of said first member being forced into a like dimensioned hollow portion of the second member to form a peripheral common contact area between said members designated as a weld area, said apparatus comprising a high frequency induction generator; a step down current transformer having primary and secondary windings, the primary winding being coupled across the output of said generator; and a highly conductive single turn coil coupled to the secondary winding and mounted concentrically in an oxygen containing atmosphere about said second member in a position in which any magnetic field established about said coil is confined about said weld area, said field inductively heating said area to a temperature which is at least equal to said first temperature and is less than said second temperature, the relative expansion between said members being such as to force any entrapped gases out of the weld area during weld formation.

6. The process of forming a vacuum-tight weld between a first metallic hollow tube having a given melting temperature and coefficient of expansion and a second hollow tube having a lower melting temperature and higher coefficient of expansion, said first tube having an internal diameter slightly smaller than the external diameter of the second tube, said process comprising the steps of forcing a section of the second tube into a section of the first tube in an oxygen-containing atmosphere to form a peripheral common contact surface between said tubes; and heating said surface until a portion of the second tube included in said surface melts and is fused to a corresponding portion of the first tube to form a weld, the relative expansion between said tubes being such as to force any entrapped gases out of the weld area during weld formation.

References Cited in the file of this patent

UNITED STATES PATENTS

| 1,891,304 | Everett | Dec. 20, 1932 |
| 2,625,637 | Garner et al. | Jan. 13, 1953 |

FOREIGN PATENTS

| 585,999 | France | Dec. 20, 1924 |
| 286,823 | Great Britain | Mar. 15, 1928 |